United States Patent [19]

Hartman

[11] Patent Number: 4,842,923

[45] Date of Patent: Jun. 27, 1989

[54] BALLISTIC MATERIALS

[75] Inventor: David R. Hartman, Newark, Ohio

[73] Assignee: Owens-Corning Fiberglas Corporation, Toledo, Ohio

[21] Appl. No.: 78,429

[22] Filed: Jul. 27, 1987

[51] Int. Cl.⁴ .................... B32B 27/42; B32B 31/20; B32B 33/00

[52] U.S. Cl. ........................................ 428/219; 2/2.5; 89/36.02; 109/80; 156/245; 156/307.5; 156/307.7; 156/312; 264/258; 264/344; 264/347; 428/220; 428/251; 428/436; 428/911; 428/920

[58] Field of Search ................. 156/245, 307.5, 307.7, 156/3.2; 264/258, 344, 347; 428/219, 251, 436, 911, 920, 220; 89/36.02

[56] References Cited

U.S. PATENT DOCUMENTS

| | | | |
|---|---|---|---|
| 4,264,671 | 4/1981 | Gillern et al. | 428/251 |
| 4,403,012 | 9/1983 | Harpell et al. | 428/290 |
| 4,529,640 | 7/1985 | Brown et al. | 428/116 |
| 4,639,387 | 1/1987 | Epel | 428/113 |
| 4,664,967 | 5/1987 | Tasdemiroglu | 428/220 |

OTHER PUBLICATIONS

Miltary specification MIL-L-6247(AT) Jun. 25, 1984 "Laminate Aramid-Fabril-Reinforced, Plastic".
D. R. Hartman "Ballistic Impact Behavior of High-Strength Glass Fiber Composites" SPI Jan. 27-31, 1986.
"Phenolic Resins" A. Knop, L. A. Pilato, Springer-Verlag pp. 160-163.
"Discover S-2 Glass Fiber" Owens-Corning Fiberglas Corporation Feb. 1985.

Primary Examiner—James C. Cannon
Attorney, Agent, or Firm—Patrick P. Pacella; Ted C. Gillespie; Robert F. Rywalski

[57] ABSTRACT

The present invention provides a fiberglass composite which possesses outstanding armor properties. This ballistic resistant composite material employs a high strength magnesia aluminosilicate glass fabric and a prescribed phenol formaldehyde condensation product as the matrix resin. The composite is produced from a prepreg by molding under controlled conditions and the prepreg material is formed with a controlled heating cycle.

19 Claims, No Drawings

BALLISTIC MATERIALS

TECHNICAL FIELD

The present invention relates to glass fiber composite articles and more particularly it relates to fiberglass composite articles which have ballistic resistant properties. Even yet more particularly the present invention relates to the formation of thick, self-supportable ballistic resistant fiber composites which may be employed as liners or as structural armor.

BACKGROUND OF THE ART

Ballistic resistant articles which contain high strength fibers for use as structural members and panels for a wide variety of military equipment are known. Thus far one of the more successful fibers is a polyaramide and more specifically poly (phenylenediamine terephthalamide). Such fibers, in fabric form, are in their usual method of use encapsulated or embedded in a composite article of a thermoset resin.

In order for a composite to have its broadest application for a wide variety of ballistic resistant applications, it is important that it likewise possess a wide balance of important properties. Such uses range from structural armor to spall suppression liners. The properties include, of course, proper ballistic performance, that is, the composite functions satisfactorily as a ballistic armor system. Other required qualities are that the material be stiff and self-supporting, machineable, able to be formed into thick durable sections, fire-resistant, smoke-resistant, non-toxic, non-conductive and thermally insulative. One important property is that the composite be capable of being easily cut, trimmed, and drilled with if need be carbide or diamond tips. Composites with this needed balance of properties are not easily manufactured or widely available.

Military specification MIL-L-62474B provides a laminate, or composite, employing a polyaramide and a laminating resin which apparently is the cured reaction product of a polyvinyl butyral, phenol formaldehyde, trimethylol phenol, and phthalic anhydride. Such laminates have utility for armor applications and spall liners but one of their more notable deficiencies is that they are not easily machined and can be easily damaged (scratched etc.). Such laminates, for a given weight per square foot, generally are quite thick, and bulky, and yet are highly susceptible to buckling and high deformations. These characteristics lead to a waste of highly valuable space in military applications.

Thus it will be seen that there is a need in the art for providing composites with a balance of properties to make them useful for a wide variety of structural armor applications and spall liners and which are made of materials other than a polyaramide. There is also a need to provide for ballistic resistant composite materials which can be more easily machined and which have good water and weather resistant properties. It will also be apparent that there is a need for composites which on a weight basis have increased ballistic performance characteristics; that is there is a need for materials have increased ballistic performance ($V_{50}$ PBL) at a given areal density. Such type materials with these many needed properties are reliably made in accordance with this invention and which for a given weight per unit of area are not bulky and have good resistance to buckling and deformation.

DISCLOSURE OF THE INVENTION

Thus in accordance with the present invention ballistic resistant materials are provided which are fire-resistant, smoke resistant, non-toxic, non-conductive, self-supporting and stiff, machineable, thick and strong so as to allow their use in structural armor applications and as ballistic resistant liners. An important feature of these composites is that they are of high uniform quality, and even thick sections do not suffer from the presence of entrapped by-product water.

Such composites can be formed by a process wherein a easily handleable prepreg is first formed. This prepreg is formed by coating, or impregnating, a balanced symmetric fabric of interlaced high strength magnesia aluminosilicate glass fibers with a solution of a partially condensed, further condensable low molecular weight phenol formaldehyde resole reaction product and evaporating the solvent from the solution. The coated, or impregnated, fabric is then heated, but not substantially higher than its gel point, to increase the resole molecular weight and thereby form the easily handleable prepreg. Prepreg plies are then molded by heating, first of all, to a temperature not substantially higher than the gel point of the resin and under contact pressure and holding it at that temperature under such contact pressure to allow by-product water to gradually escape; they are then heated to an elevated temperature and held at that temperature to fully polycondense and cure the resin. A plurality of plies of such prepregs will be molded and thereby form composites having an areal density greater than at least about 2.5 pounds per square foot. Typically the laminated composite panels formed in accordance with the present invention, when formed to a thickness of the order of about ¼ inch with an areal density between about 4.5 to about 5.2 (pounds per square foot), will have a $V_{50}$ value (protection ballistic limit) of in excess of about 2,715 feet per second up to as high as 2,865 feet per second or even higher (with 44 grain steel 0.30 caliber fragment simulating projectiles). These values are significantly higher than those reported in U.S. Pat. No. 4,664,967.

DETAILED DESCRIPTION OF THE INVENTION INCLUDING THE BEST MODE OF CARRYING IT OUT

In practicing the present invention conventional equipment and techniques may be employed both for producing the prepreg and for the compression molding of the prepregs into the final composite product. Thus, for example, when forming the prepreg, a fabric of interlaced high strength magnesia aluminosilicate glass fibers can be dipped into a solution of the phenol formaldehyde resin, passed through nip rolls, the solvent evaporated and a controlled further condensation heat treatment given to form a handleable prepreg. Compression molding of a plurality of plies of the prepreg material can be done using any commercially available compression molding equipment.

The number of prepreg plies which are compression molded will generally be sufficient to form a final composite product having an areal density of at least about 2.5 pounds per square foot. For other applications, for example, ship board type applications it generally will be desirable to form composites having densities in excess of about 7.5 and typically between about 7.5 to about 8.5 pounds per square foot. Satisfactory vehicle spall liners are produced by using a sufficient number of plies to produce a areal density of in excess of about 3.9 pounds per square foot and typically between about 3.9 and about 5.2 pounds per square foot. Usually on the order of about 13 to about 26 plies will produce outstanding products. Typically, with a glass content in the final product on the order of about 78% to about 84% (by weight), outstanding composites are achieved. Generally the ballistic resistant panels of this invention will have a thickness on the order of at least about ¼ inch and may be as thick as 3 inches or more. The flexural strengths of the final ballistic resistant composites of the present invention typically will be in excess of about 25,000 psi and the flexural modulus will generally be on the order of an excess of about 4,000,000 psi.

As indicated, a balanced symmetric fabric of interlaced high strength magnesia aluminosilicate glass fibers is employed. By balanced symmetric fabric of interlaced fibers is meant a fabric comprised of an assembly of approximately parallel and perpendicular equal spaced, equal weight glass fibers. Preferred fabrics are those with biaxial symmetry. Thus, for example, a (plus and minus 45) helical filament-wound glass mat can be employed as well as a stitched glass fiber assembly, but it is most preferred that a woven glass roving be used. The woven roving may be of a plain weave or a twill weave (for example 1:3), or satin weave or modifications thereof allowing a balanced symmetric structure. The weight per unit area of the fabric employed preferably will be between at least about 18 to about 48 with a fabric having a value of about 24 ounces per square yard producing outstanding results. The interlaced fibers of the glass fabric generally will have a yield of less than about 750 yards per pound. Fibers with yields on the order of about 250 yards per pound produce good quality materials. Generally it is preferred to employ fibers with a yield in excess of about 100 yards per pound. Monofilament fibers which form the fabric, or roving, and which are of G or K diameter produce highly desirable results. These monofilament fibers have diameters of about 15 microns or less and generally about 8 to about 15 microns.

Magnesia aluminosilicate glass fibers used herein are high strength fibers and typically have a tensile strength in excess of about 500,000 psi. These fibers are roughly about two-thirds by weight silica, and typically on the order of about 65% by weight silica, and one-third being magnesia and alumina with the alumina being present in a greater amount than the magnesia. Typically alumina will be about 25% by weight and magnesia about 10% by weight for outstanding results. Best results are obtained when the fibers have a water resistant, impact debondable size coating thereon. Preferred size coatings are sizes containing an epoxy based film former and an epoxy silane coupling agent along with other conventional materials. Water resistance of the size can be tested by a boiling water test in which fiber composites are immersed for about 2 hours and then dried. Fibers which retain at least about 80% of their original flexural strength possess sufficient water resistance. (See ASTM-D570 and ASTM-D790 for fuller details). By impact debondable size is meant a size which, during processing, when glass fiber bundles are placed in the liquid matrix resin allows the glass fibers to disperse well but, when within the composite matrix, the sized fibers have an interfacial shear strength, or adhesion, with the resin matrix to permit filament and bundle debonding and pullout which balances compressive - shear failure. The latter features can be evaluated by ASTM-D2344 (interfacial shear strengths measured by short beam shear test) and ASTM-D695 (a compression test through composite thickness). Interfacial shear strengths by the short beam test of less than 6000 psi are desirable with good results being obtained at about 2000 psi. The compression test values are desirably in excess of about 90,000 psi, preferably in excess of about 100,000 psi with values in the approximate range of 100,000-120,000 psi producing good results.

The phenol formaldehyde resin is a resole phenolic and is not new per se. These types of resins have been used in the past for forming phenolic resin-fiber composites by such conventional techniques as hand lay up, hot molding, vacuum injection, filament winding, pultrusion or prepreg techniques. Satisfactory results will be obtained by employing resins in which the molar reactant ratio of formaldehyde to phenol is between about 1:1 to about 3:1, preferably about 1:1 and about 2:1 with best results being obtained at about 1.1:1 to about 1.5 or 1.6:1. Above the 3:1 ratio ballistic resistance or stopping power may be satisfactory but the damage area upon ballistic impact is increased. The damage area includes both the composite deformation and localized delamination or ply separation. These resins are low molecular weight materials and outstanding results have been obtained using resins having weight average molecular weights in the range of about 200 to about 800. The resins are commercially available and are supplied in solvent solutions. Best results have been obtained employing solvent solutions of the partially condensed further condensable low molecular weight phenol formaldehyde resole in which the solutions contain free phenol as well as free formaldehyde. The solutions also can contain free water. Typical solvents employed are ethyl alcohol, isopropyl alcohol and methylethyl ketone or combinations thereof. Best results have been obtained employing solvent solutions containing on the order of about 50 to 70% by weight solids, about 2 or 3% up to about 16 or 17% by weight of free phenol and between about 0.1 up to about 2% by weight of free formaldehyde. Outstanding results were obtained using solids contents between about 60 to 66% by weight, free formaldehyde of about 1% by weight and free phenol between about 5 to about 16% by weight. The solutions which produce best results contain on the order of 24 or 25% of either ethyl alcohol or isopropyl alcohol, with the latter being preferred, and free water being less than about 10%. The viscosities of solutions typically employed for forming the prepreg will be on the order of about 100 to about 400 centipoise.

Once the fabric of the interlaced glass fibers is impregnated or coated with the resole phenol solution and the solvent evaporated, the material will be heated to a temperature not substantially higher than the gel point of the resin and held at that temperature for a sufficient period of time to increase its molecular weight and form a prepreg which, upon cooling to room temperature, is easily handleable. It will, of course, be apparent to those skilled in the art that handleability takes in a wide variety of important properties including proper drape, appropriate tack, and good machinability. As used herein the gel point means that stage at which the resole phenolic resin exhibits a rather sudden and somewhat dramatic increase in the viscosity, and generally the rate at which the viscosity increases with time and/or temperature. The gel points are generally between about 275° F. to about 290° F. The resole phenol, after this heating, will have an increased molecular weight but still generally less than about 1500, thus indicating the presence of significant amount of oligomers. If heating is not done for a sufficient period of time, a handleable prepreg will not be formed. Typically it will be too tacky and very difficult to transfer. Excessive heating causes too much polycondensation at this time and, this in turn, will cause difficulties in consolidation during molding. Prior to the above noted staging by heating the resin, the partially condensed further condensable resole has a heat of reaction of about 100 to about 250 Joules per gram. Sufficient heating will generally result in a resin having a decreased heat of reaction, e.g. sufficient to produce a further condensable resin having a heat of reaction of about 10 to about 90 Joules/gram. Alternatively, it may be stated that once the solvent is evaporated, the resole resin material is heated for sufficient period of time such that the solids level is increased and retained in the range of about 64 to about 72%.

If desired, and as will be apparent to those skilled in the art various adjuvants, catalyst or other materials can be added to the solvent solution to beneficially impact upon the characteristic features of the final product or to enhance the rate at which they can be formed. Thus, for example, if desired acids like Lewis acids can be added to enhance the rate of curing. Boric acid and para-toluene sulfonic acid are especially desirable. Carbon black can be added for a variety of purposes. In addition to aiding general flow characteristics of the phenolic, carbon black at low levels, for example, 1 to 2% by weight is desirable for coloration purposes. Between 1 and 5% by weight, carbon black will also provide UV protection and higher percentages, up to about 15% by weight, increases the electrical conductivity and the heat of ablation of the ballistic resistant composite. Most desirably the carbon black, if employed, will be employed in the amount of about 2 to 7% by weight and the particle size will be on the order of about 30 to about 70 millimicrons.

After cooling the prepreg material to room temperature the prepregs may be stored or, if desired, can be immediately used to form the final product. The final product is obtained by stacking a plurality of the prepregs in a compression mold and then controllably heating under controlled pressure to form a final product which is free of entrapped water vapor. Quite surprisingly by following the present teachings a thick resole composite can be easily formed, for example, one on the order of at least about ¼ inch in thickness and, quite surprisingly, even thicker materials, for example, ½ inch to 3 inches and even thicker. This can be, quite surprisingly, done without significant problems with entrapped water. In contrast if prior art compression molding techniques were followed it would not be possible to make such thick articles. Prior art techniques generally involve heating the material and "bumping" at about 330° to 350° F. In such prior art techniques the mold is closed, pressurized and heated to about 330° F. then "bumped" by opening the mold, followed by an optional repeating of the cycle, then final molding. These bumping cycles of the prior art are not adequate to properly release the moisture by-product when forming thick composites.

In accordance with the present invention, the prepregs are heated to a temperature not substantially higher than the gel point while under contact pressure of the compression mold and it is held at that temperature and pressure to consolidate and allow volatile condensation products to escape. Contact pressure essentially means the pressure inherently applied by the mold tools without positive and affirmative pressurization. With a relatively large compression molding machine this contact pressure may be on the order of about 30 psi or less (with smaller molding units the contact pressure will be on the order of about 2 to 3 pounds per square inch). After heating under this contact pressure, the mold pressure is then increased and the temperature taken up to a curing temperature, for example, about 300° to 350° F. The material is then held there for a sufficient period of time to fully poly condense and cure the phenol-formaldehyde reaction product into a crosslinked structure, thereby forming ballistic resistant panels (including rectilinear and curvilinear shapes) having the properties indicated above. An exemplary heating cycle would be to heat the stacked plies of the prepreg under contact pressure up to 275° F. and hold it there for approximately 7 minutes after which time the pressure can be increased and the temperature taken to about 340° to 350° F. The materials are then held at that temperature for on the order of about 30 minutes and generally under a pressure of at least about 115 psi and typically in the range of about 115 psi to 300 psi. After this, the material is cooled under pressure to about 150° F. after which time the pressure is released and the final material cooled to room temperature. As generally indicated above, the areal density of the final products will be at least about 2.5 pounds per square foot and more desirably at least about 4 pounds per square foot. This areal density, of course, is obtained by varying the number of plies that are employed in compression molding the final product.

While the above enables those skilled in the art to make and use the present invention, a more specific example follows.

EXAMPLE

Woven roving available from Owens-Corning Fiberglas Corporation under the designation S-2 Glass, 250 AA463 5×5.12 PW (a plain weave woven roving of sized magnesia aluminosilicate glass fibers of G filament diameter) and generally of the following specifications: an S-2 Glass input roving yield of 250 yards per pound, a woven weight of 24 ounces per square yard with a plain weave construction of 5 warp and 5.12 fill ends per inch was employed. The resole phenolic solution was that commercially available from the Borden Chemical Company as their designation SC1008. This is a solution containing about 60 to about 66% by weight solids and on the order of about 25% by weight isopropyl alcohol as the solvent. Free formaldehyde is about 1% and free phenol about 10 to 16% by weight. It had a pH of about 8.0 and a viscosity of about 180 to 300 centipoise. The SC-1008 resin was applied and transferred to the woven roving by compaction rollers with a nip setting of 22–26 mils. (Alternatively a doctor blade technique can be used.) The solvent was evaporated and the impregnated woven roving was heated to, and held at a temperature of about 250° to 275° F. for about 10–12 minutes. The heat of reaction of the phenol formaldehyde was about 40 Joules per gram at 68% solids. After cooling the prepregs were compression molded using conventional peel ply materials. The tools of the compression mold can also be treated with a release material to minimize sticking. Twenty-six plies of prepreg were positioned in a preheated mold, the plies being sufficient to provide a final product thickness of about one-half inch.

The compression mold was closed but no affirmative pressure was added to the mold and only the contact pressure of the mold tools contributed to the pressure. This was on the order of about 5 pounds per square inch. The mold was at a temperature of about 275° F. and the prepreg plies were held at that temperature for about 7 minutes. A thermocouple was employed to determine heat transfer and be certain that essentially the entire mass of prepreg had reached that 275° F. temperature in the 7 minute interval. After that dwell time the mold was pressurized (anywhere between 115 to 300 psi) and heated to 340°–350° F. It took about 15 minutes to reach that temperature and then the prepreg materials were held at that temperature for approximately 30 minutes. Over about a 10 minute interval the molded prepregs were then cooled, under pressure, to about 150° F., the pressure then released and the molded prepreg cooled to room temperature. The material produced was fire-resistant, smoke resistant and essentially non-toxic when burned. The laminate was stiff and self-supporting and was easily machined using a diamond tip and carbide water cooled tools and virtually free of entrapped water. The thickness of laminates was about ½ inch and laminates had an areal density of about 4.5 to about 5.2 pounds per square foot and $V_{50}$ values (44 grain steel 0.30 caliber fragment simulating projectiles) of between about 2715 to about 2865 feet per second. These are outstanding values, especially for spall liners.

In contrast, and in comparative testing, when the prior art technique was employed of simply heating the compression mold to about 330° to 350° F. and then bumping by opening the molds to release water vapor and then closing and continuing the curing, problems with forming a quality product existed. That is thick, high areal density materials could not be formed because of the inability to release the by-product water at thicknesses of greater than about ¼ inch. With such prior art technique such composites have unacceptable ballistic performance levels.

Having described my invention it is, of course, apparent that modifications are possible which pursuant to the patent statutes and laws do not depart from the spirit and scope thereof.

I claim:

1. A glass fiber composite, said composite being resistant to buckling and deformation, fire-resistant and smoke resistant, machineable, self-supporting and having an areal density of at least about 2.5 pounds per square foot, said composite having a thickness greater than about ¼ inch and comprising a plurality of layers of a balanced interlaced high strength magnesia aluminosilicate glass fiber fabric in a matrix of a cured phenol formaldehyde resole resin, said composite being substantially free of entrapped water vapor, said fiber of said fabric having an impact debondable size coating thereon said size being, said size being characterized by an interfacial shear strength (ASTM D2344) of less than 6,000 psi and a compression value (ASTM D695) of in excess of about 90,000 psi, and said phenol formaldehyde resole resin being a resin formed by reacting formaldehyde and phenol at a molar ratio of greater than about 1:1 and less than about 3:1.

2. The composite of claim 1 wherein said composite has a flexural strength in excess of about 25000 psi, and a flexural modulus in excess of about 4,000,000 psi.

3. The composite of claim 2 wherein said composite, when at an areal density of between about 4.5 to about 5.2 pounds per square foot has a $V_{50}$ value between about 2,715 feet per second to about 2,865 feet per second.

4. A process for producing a stiff and self-supporting, machineable, thick, fire-resistant and smoke resistant, ballistic resistant material comprising: coating a balanced symmetric fabric of interlaced high strength magnesia aluminosilicate glass fibers with a solution of a partially condensed further condensable phenol formaldehyde resole reaction product, said solution containing free phenol and free formaldehyde and being formed by reacting formaldehyde and phenol in a molar ratio of greater than about 1:1 and less than about 3:1, said fibers having a water resistant debondable size coating thereon and a yield of less than about 750 yards per pound, said size being characterized by an interfacial shear strength (ASTM D2344) of less than 6,000 psi and a compression value (ASTM D695) of in excess of about 90,000 psi; evaporating solvent from said solution and heating the resole coated fabric to a temperature up to about the gel point of the phenol formaldehyde resole reaction product to further condense the resole and increase its molecular weight and cooling said reaction product to form a handleable prepreg; stacking a plurality of said prepregs into a compression mold; heating said prepregs under contact pressure in said mold to a temperature up to about the gel point of the phenol formaldehyde and holding at that temperature to allow volatile condensation by-products to escape; further heating said prepregs to an elevated temperature and holding said prepregs at that temperature, while at a pressure higher than said contact pressure, for a sufficient period of time to substantially fully polycondense and cure the phenol formaldehyde reaction product and form said ballistic resistant material having an areal density greater than about 2.5 pounds per square foot.

5. The process of claim 4 wherein said fabric is a plain weave or twill weave woven roving.

6. The process of claim 4 wherein said fibers have a tensile strength of at least about 500,000 psi.

7. The process of claim 4 wherein said ballistic material contains about 78 to about 84% by weight of glass.

8. The process of claim 4 wherein said ballistic resistant material has an areal density of at least about 4 pounds per square foot.

9. The process of claim 4 wherein the weight per unit area of said fabric is between at least about 18 to about 48 ounces per square yard.

10. The process of claim 4 wherein said fibers have a filament diameter of about 8 microns to about 15 microns and have a yield of about 250 yards per pound.

11. The process of claim 4 wherein the phenol formaldehyde resole resin is produced by reacting formaldehyde and phenol in a mole ratio of about 1.1:1 to about 1.6:1.

12. The process of claim 4 wherein said phenol formaldehyde resole in said solution has a weight average molecular weight between about 200 and 800.

13. The process of claim 12 wherein the coated fabric is heated below such gel point for a sufficient period of time to increase the molecular weight of the phenol formaldehyde up to about 1500 or less.

14. The process of claim 4 wherein said contact pressure is about 30 psi or less.

15. The process of claim 4 wherein said gel point is about 275° F. to about 290° F.

16. The process of claim 4 wherein said phenol formaldehyde resole in said solution has a molecular weight of about 200 to about 800, the gel point is about 275° F. to about 290° F. and the coated fabric is heated for a sufficient period of time to increase the resole molecular weight to about 1500 or less, said resole after heating having a heat of reaction of about 10–90 Joules per gram.

17. The process of claim 16 wherein the contact pressure is between about 3 to about 20 psi and the stacked prepregs are held under that contact pressure at about 275° F. for at least about 7 minutes.

18. A process for producing a fire-resistant, smoke resistant, stiff and self-supporting machineable ballistic resistant material having an areal density of at least about 2.5 pounds per square foot comprising: stacking a plurality of prepregs into a compression mold, said prepregs being formed by a process which comprises coating a balanced symmetric fabric of interlaced high strength magnesia aluminosilicate fibers with a solution of a phenol formaldehyde resole reaction product, wherein said fibers have an impact debondable size coating thereon said size being characterized by an interfacial shear strength (ASTM D2344) of less than 6,000 psi and a compression value (ASTM D695) of in excess of about 90,000 psi, and wherein said resole is formed from the reaction of formaldehyde and phenol in a mole ratio of at least 1:1 to about 2:1 and wherein said coated fabric is heated to a temperature up to about 275° F. and held at that temperature so as to further polymerize the phenol formaldehyde reaction product; heating said stacked prepregs in said mold under contact pressure to a temperature of about 275° F. and holding it at that temperature for at least about 7 minutes; increasing the mold pressure to at least about 115 psi and heating said prepreg to a temperature of at least of about 340° F. and holding said stack of prepregs at that temperature under that pressure for a sufficient period of time to substantially fully polycondense the phenol formaldehyde reaction product and form said ballistic resistant material.

19. The process of claim 18 wherein said solution contains carbon black.

* * * * *